United States Patent [19]

Steinführer

[11] Patent Number: 4,951,295
[45] Date of Patent: Aug. 21, 1990

[54] PREIONIZATION MEANS FOR A GAS-DISCHARGE LASER

[75] Inventor: Gerd Steinführer, Bovenden, Fed. Rep. of Germany

[73] Assignee: Lambda-Physik Forschungs-und Entwicklungs GmbH, Gottingen, Fed. Rep. of Germany

[21] Appl. No.: 354,142

[22] Filed: May 19, 1989

[30] Foreign Application Priority Data

Jun. 9, 1988 [DE] Fed. Rep. of Germany ....... 3819731

[51] Int. Cl.$^5$ .............................................. H01S 3/097
[52] U.S. Cl. ........................................ 372/86; 372/87; 372/55

[58] Field of Search ............................. 372/86, 87, 55

[56] References Cited

U.S. PATENT DOCUMENTS 4,555,787  1/1985  Cohn et al. ........................... 372/86

Primary Examiner—Léon Scott, Jr.
Attorney, Agent, or Firm—Irell & Manella

[57] ABSTRACT

A preionization means for a gas-discharge laser, such as an excimer laser, comprises a stirrup member 26 and a preionization strip 20 secured thereto. To obtain the longest possible life of the laser with economical material use the preionization strip 20 is made from a different material from the stirrup member 26.

3 Claims, 2 Drawing Sheets

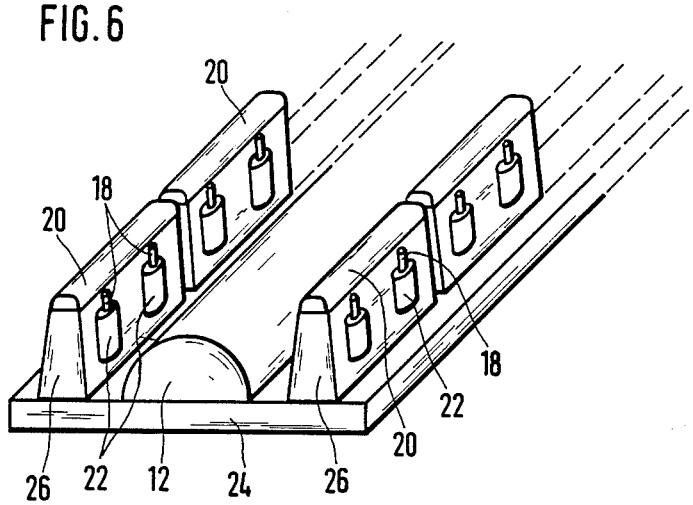

PREIONIZATION MEANS FOR A GAS-DISCHARGE LASER

The invention relates to a preionization means for a gas-discharge laser comprising a stirrup member and a preionization strip of electrically conductive material secured thereto.

Possible gas-discharge lasers in the sense of the invention are in particular lasers with transversal excitation of the working gas between main electrodes, such as excimer lasers.

Such lasers generally have a so-called preionization means with which the working gas before ignition of the main discharge is preionized between the main electrodes. The preionization can be carried out with various means, such as electron radiation and X-ray radiation as well as preionizing sparks ignited near the main electrodes. This is known to the expert and need not be explained in detail here. The invention relates to the preionization by means of sparks It is known to provide as means for preionization by means of sparks so-called preionization stirrup members including a preionization strip formed integrally therewith. As a rule a plurality of preionization pins extend into such a preionization stirrup member and the spark current for the preionization flows between the tip of such a pin and an edge of the preionization strip. The known preionization stirrup members or bows with integral preionization strip consist throughout of the same material.

The life of gas-discharge lasers, in particular excimer lasers, depends essentially on the materials used. This applies not only to the main electrodes but also to the preionization means.

The invention is based on the problem of providing a preionization means for a gas-discharge laser, in particular an excimer laser, of the type mentioned at the beginning which permits economically a long life of the laser.

According to the invention this problem is solved in that to the preionization stirrup member a preionization strip is secure which consists of different material from the stirrup member.

The invention is based on the recognition that in laser operation essentially only the preionization strip is subjected to the strain of the preionization spark discharge, in particular by spark erosion or the like. Since in the prior art the stirrup member and the preionization strip were made from the same material there were considerable restrictions regarding the choice of the material, both for cost reasons and for technical reasons. For cost reasons the stirrup member itself must consist of easily workable electrically conductive material. Due to this restriction, in the prior art disadvantages were accepted as regards the quality of the material for the preionization strip.

If however as provided by the invention the stirrup member on the one hand and the preionization strip on the other hand are made from different materials, the stirrup member for example can be bent and stamped from cheap and easily workable material, for example copper or brass, whilst for the preionization strip a difficultly workable material can be used because it need only be slightly machined, or not at all.

According to the invention it is also possible to vary the material for the preionization strip whilst leaving the stirrup member unchanged.

Preferably, for the preionization strip a hard metal can be used. The electrically conductive connection between the preionization strip can be established in form-locking manner and/or by hard soldering.

Hereinafter examples of embodiment of the invention will be explained in detail with reference to the drawings, wherein:

FIG. 6 shows schematically a perspective view of a plurality of preionization means according to the invention in the assembled state.

Figure 1:
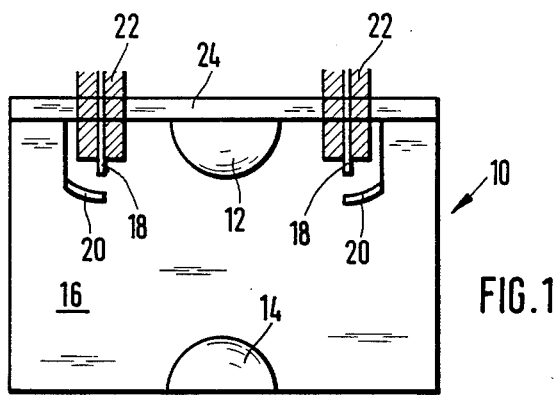
FIG. 1 shows schematically a section through an excimer laser.

FIG. 1 shows schematically a laser chamber 10 having main electrodes 12, 14, known per se, arranged opposite each other in a gas-discharge space 16.

A preionization means comprises preionization pins 18 and preionization strips 20 which are arranged in known manner near the main electrodes 12, 14. An electric spark jumping between the preionization pins 18 and the preionization strip 20 generates in known manner charge carriers in the gas-discharge space 16. The parts are mounted on a base plate 24. The preionization pins 18 are insulated with respect to the base plate 24 by means of insulations 22. The arrangement according to FIG. 1 is known per se to the expert.

Figure 2:
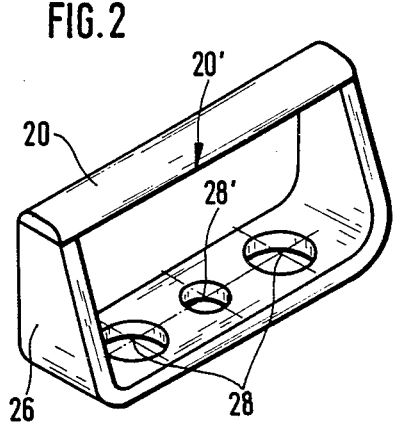
FIG. 2 shows a first example of the embodiment of a preionization means.

FIG. 2 shows a first example of embodiment of a preionization means according to the invention comprising a preionization strip 20 and a stirrup member 26. The stirrup member 26 is secured to the base plate 24 (cf. also FIG. 6), for example by means of a screw which is led through a hole 28' formed centrally in the bottom of the stirrup member 26. Preionization pins 18 with their insulations 22 project through the holes 28 shown in the example of embodiment on the left and right of the centre hole 28'.

Whereas the stirrup member 26 consists of an easily machineable conductive material, for example copper or brass which can be easily stamped and bent, the preionization strip 20 consists of a material which cannot be worked as easily. In particular, a hard metal can be used. The restrictions as regards the costs for the preionization strip 20, which is decisive for the life of the laser, are also less than those for the stirrup member 26 because less material is necessary than in an arrangement in which the stirrup member and preionization strip consist of the same material.

When using a particularly expensive material for the preionization strip it is possible to make only the front edge 20' (FIG. 2) of said material whilst the main part of the preionization strip 20 consists of more economical material.

The following materials have been found favourable for the stirrup member: Cu, Cu alloys, in particular CuZn37, CuBe2, CuAl28,CuNi30MnlFe; and Al, Al alloys, in particular AlCuMgl, AlMg3;furthermore Ni, Ni alloys; and special steels (e.g. 1,4301, 1,4571).

Apart from the materials specified above for the stirrup member the following materials have been found favourable for the preionization strip: Ni alloys, in particular NiCr19Nb, CuNi30Mn, NiCu30F; Al-chromium alloys, in particular CrAl1255; Ti, W, WCu, MoCu30, WNi, WNiFe, $ZrO_2$, CuCr, Ta, Nb, W/10Ti, Ni/$Cr^2$, Co/$Cr^2$, Ti/$Al^2$, Ta/$Al^2$, WC and TiC.

The electrically conductive connection between the stirrup member 26 and the preionization strip 20 is effected by soldering or welding. The preionization strip 20 is connected electrically conductively to the ground plate 24 via the stirrup member 26, i.e. is grounded.

Figure 3:
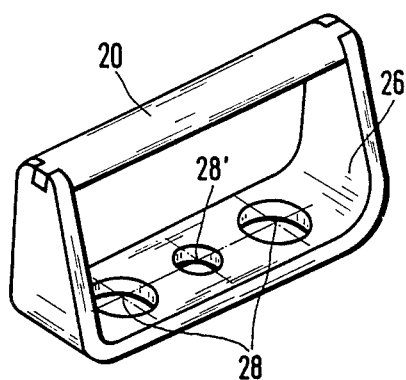
FIG. 3 shows a second example of embodiment of a preionization means.
Figure 4:
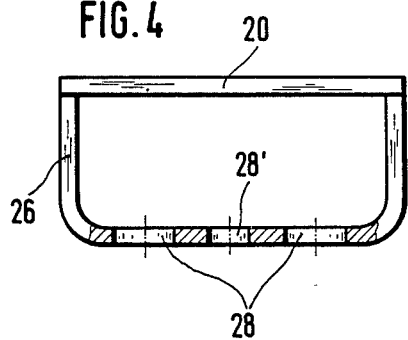
FIG. 4 is a central longitudinal section through a preionization means according to FIGS. 2 and 3.
Figure 5:
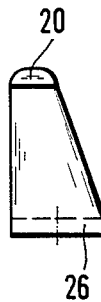
FIG. 5 is a cross-section through a preionization means according to FIGS. 2 and 3.

In the example of embodiment illustrated in FIG. 3 a formlocking connection is provided between the preionization strip and the stirrup member 26 and can be supplemented if necessary by soldering or welding.

FIG. 6 shows schematically several preionization means each consisting of a stirrup member 26 and a preionization strip 20 which are mounted in known manner adjacent each other along the sides of a main electrode 12.

I claim:

1. In a spark preionization means for use in a gas-discharge laser, the preionization means comprising:
   a stirrup member comprising a first material; and
   a preionization strip comprising a second material, secured to said stirrup member by an electrically conductive connection, wherein
   said first material is an easily-workable electrically-conductive material, and said second material is a difficulty-workable electrically-conductive material.

2. The preionization means of claim 1, wherein said first material is selected from the group consisting of Cu, Cu alloys, Al, Al alloys, Ni, Ni alloys, and special steels; and
   said second material is selected from the group consisting of Cu, Cu alloys, Al, Al alloys, Ni, Ni alloys, special steels, Al-chromium alloys, Ti, W. SCu, MoCu 30, WNi, $ZrO_2$, CuCr, Ta, Nb, W/10Ti, Ni/Crhu 2, Co/$Cr^2$, Ti/$Al^2$, Ta/$Al^2$, WC and TiC.

3. The preionization means of claim 2, wherein said first material is selected from the group consisting of CuZn37, CuBe2, CuAl28, CuNi30Mn1Fe, AlCuMg1, AlMg3, and special steels 1,4301 and 1,457; and
   said second material is selected from the group consisting of NiCr19Nb, CuNi30Mn, NiCu30Fe, CrAl225, Ti, W, SCu, MoCu 30, WNi, $ZrO_2$, CuCr, Ta, Nb, W/10Ti, Ni/$Cr^2$, Ti/$Al^2$, Ta/$Al^2$, WC and TiC.

* * * * *